United States Patent [19]
Janssen-Weets

[11] Patent Number: 5,150,103
[45] Date of Patent: Sep. 22, 1992

[54] FIXTURE CONTAINING COMPACT ROTATIONAL POSITIONING SENSOR

[75] Inventor: Peter Janssen-Weets, Goldenstedt, Fed. Rep. of Germany

[73] Assignee: Univam Armaturentechnologie GmbH, Wildeshausen, Fed. Rep. of Germany

[21] Appl. No.: 642,414

[22] Filed: Jan. 17, 1991

[30] Foreign Application Priority Data

Jan. 20, 1990 [DE] Fed. Rep. of Germany ... 9000605[U]

[51] Int. Cl.⁵ .......................................... G08B 21/00
[52] U.S. Cl. ................................... 340/686; 340/584; 340/604; 340/671; 250/231.13
[58] Field of Search ............... 340/686, 671, 604, 605, 340/584, 521; 361/170; 356/375; 200/61.41; 250/231.13–231.18; 251/129.01

[56] References Cited

U.S. PATENT DOCUMENTS

| 3,835,373 | 9/1974 | Mastula ................ 340/671 X |
| 3,921,159 | 11/1975 | Steffen ................... 340/671 |
| 4,103,155 | 7/1978 | Clark .................... 250/231.13 |
| 4,195,291 | 3/1980 | Burks, Jr. ............... 340/671 |
| 4,318,010 | 3/1982 | Hurley, III et al. ........ 307/261 |
| 4,356,397 | 10/1982 | Lenderking et al. ..... 250/231.13 |
| 4,697,173 | 9/1987 | Stokes ................. 340/671 X |
| 4,870,272 | 9/1989 | Wilson, III ........... 250/231 SE |

FOREIGN PATENT DOCUMENTS

| 0051961 | 5/1982 | European Pat. Off. . |
| 0024424 | 11/1984 | European Pat. Off. . |
| 0182733 | 5/1985 | European Pat. Off. . |
| 662558 | 7/1938 | Fed. Rep. of Germany . |
| 1566781 | 8/1970 | Fed. Rep. of Germany . |
| 2049355 | 10/1971 | Fed. Rep. of Germany . |
| 2659760 | 7/1977 | Fed. Rep. of Germany . |
| 8116787.3 | 1/1982 | Fed. Rep. of Germany . |
| 3117704A1 | 4/1982 | Fed. Rep. of Germany . |
| 3133401A1 | 7/1982 | Fed. Rep. of Germany . |
| 3212792A1 | 10/1983 | Fed. Rep. of Germany . |
| 3324176A1 | 1/1984 | Fed. Rep. of Germany . |
| 3716465A1 | 12/1988 | Fed. Rep. of Germany . |
| 3821083A1 | 1/1989 | Fed. Rep. of Germany . |
| 3733495A1 | 4/1989 | Fed. Rep. of Germany . |
| 3743312A1 | 6/1989 | Fed. Rep. of Germany . |
| WO 82/02631 | 8/1982 | PCT Int'l Appl. . |
| 1526211 | 9/1978 | United Kingdom . |
| 1575636 | 9/1980 | United Kingdom . |
| 2138108A | 10/1984 | United Kingdom . |

OTHER PUBLICATIONS

Article: "Drehgeber als hochgenaue Weg-und Winkelmerssger te", Alfons Ernst, Traunreut (no Translation).

Primary Examiner—Jin F. Ng
Assistant Examiner—Thomas J. Mullen, Jr.
Attorney, Agent, or Firm—Merchant, Gould, Smith, Edell, Welter & Schmidt

[57] ABSTRACT

A fixture containing a compact rotational position sensor mounted directly to a driving contrivance for detecting movement of a member. The fixture comprises an attachment flange having a central bore with a front face for engagement with the driving contrivance. The front face has a recess proximate to the central bore and an opening from the outer surface of the attachment flange in communication with the recess. A control shaft passes through a central bore whereby the control end is attached to the member and the free end is attached to the driving contrivance. The sensor for detecting the rotational position of the control shaft is disposed in the recess whereby the attachment flange conceals the sensor when it is attached to the driving contrivance.

17 Claims, 6 Drawing Sheets

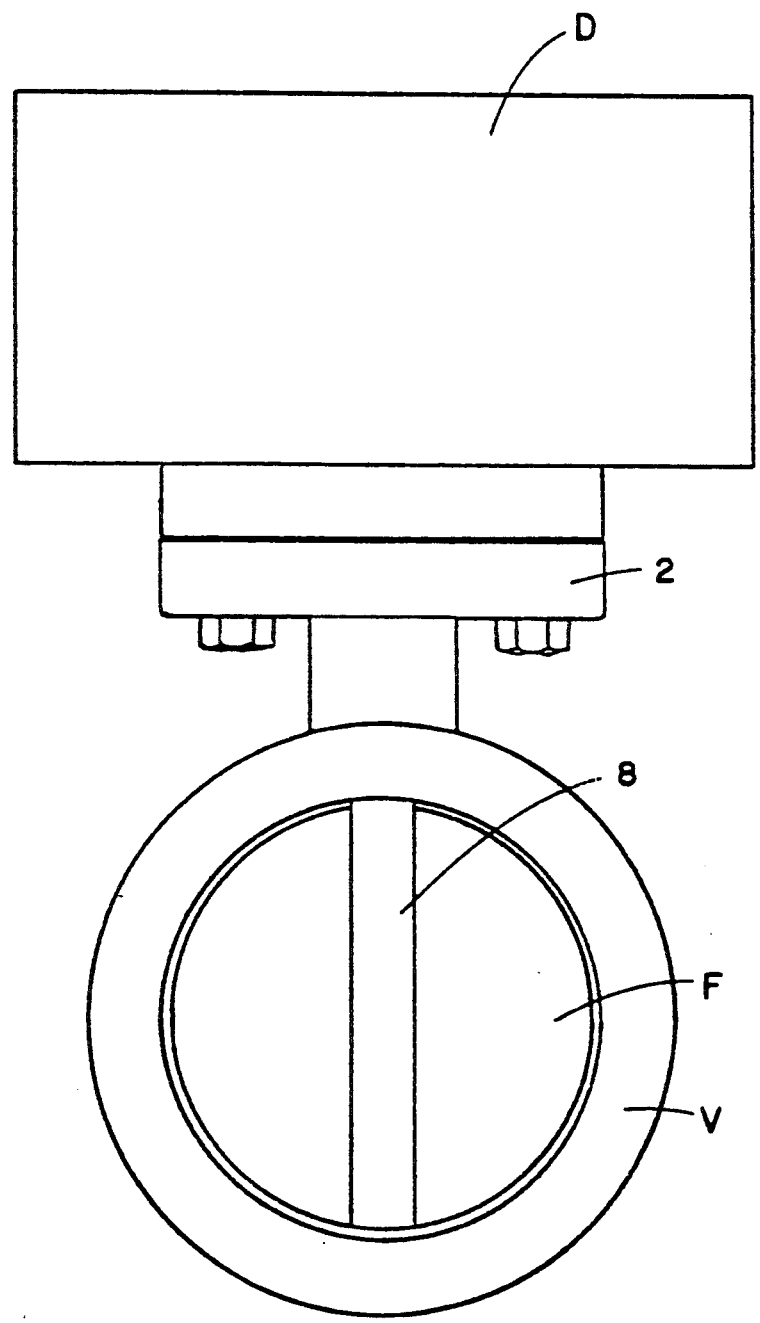

5,150,103

FIXTURE CONTAINING COMPACT ROTATIONAL POSITIONING SENSOR

BACKGROUND OF THE INVENTION

The invention concerns a fixture with a member that can be moved into different operating positions by means of a control shaft, and having an attachment flange through whose front face is led to the outside one end of the control shaft for connection to a driving contrivance that is to be attached to the front face of the attachment flange.

These types of fixtures are known. In the case of these fixtures, the attachment flange forms, with its front face, an interface for the driving contrivance. Of course, the driving contrivance is to be mounted on the front face of the attachment flange. Since the control shaft is to be led to the outside with its one end through the front face of the attachment flange, the driving contrivance is constructed such that it is brought into active engagement with the control shaft when it is placed on the front face of the attachment flange. For this purpose, the driving contrivance generally has an output shaft driven by a drive, said output shaft capable of being coupled to the control shaft of the fixture, and actually in axially-aligning fashion when the control shaft of the fixture is driven in rotary fashion by the output shaft of the driving contrivance. The dimensions of the precedingly-described interface between the fixture and the driving contrivance to be attached thereto are standardized.

Falling under the precedingly-described fixture, for example, is also a control valve for controlling the flow of a medium, as for example a liquid. The movable member here serves for closing the control valve. In general, the movable element in a control valve is constructed as a shutter-disk, ball, stopcock or cone, and is joined in rotation-fast manner at its hinge and/or rotation point with the control shaft, the axis of which aligns with the hinge and/or axis of rotation, so that the control shaft must be correspondingly rotated for closing and opening the movable element.

In order to be able to detect and indicate the position of the control shaft and therewith the operating position of the movable member, it was necessary, up until now, to provide additional adapters and components which, in general, were mounted either between the fixture and the driving contrivance or at an auxiliary interface at the driving contrivance.

In the first case, i.e. when mounting between the fixture and the driving contrivance, placed on the front face of the attachment flange was a transmitter unit, while the driving contrivance was then attached on the side of the transmitter unit away from the front face of the attachment flange. Resulting from this was that the driving contrivance had to be disposed at some distance from the fixture. Then, in order that the active connection with the driving contrivance not be lost, a shaft-connecting piece had to be interposed inside the transmitter unit, between the free end of the control shaft and the driving contrivance. For an control valve of the above-described kind, a transmitter unit of this type displayed a frameform adapter that was mounted with its one side on the front face of the control valve, with the driving arrangement being set on its oppositely-lying side with its mating counter flange, along with the previously-described intervening shaft piece, which was passed through borings in the adapter and provided with an indicating pin. This indicating pin therewith provided a mechanical indication of the rotational position of the control shaft. Since, however, as a rule, the viewing conditions at the place where the control valve is installed are quite different from application to application, it was later necessary to calibrate the indicating pin. Showing up from this was that this later calibration was not always correctly carried out. Because of the frequently confined space conditions prevailing at the location of installation, even with correct calibration of the indicating pin, a trouble-free recognition of the rotational position of the control shaft was not always possible.

A significant disadvantage of this type of arrangement of the transmitter unit between the fixture and the driving contrivance lies in the increase of the structural volume of the entire arrangement made up of fixture and driving contrivance, which, of course, because of the frequently tight space conditions prevailing at the installation location, is not always possible and also contradicts the corresponding standard. For these reasons, a direct mounting of the driving contrivance on the front face of the attachment flange with the fixture is absolutely necessary.

In the second case, namely when mounting the transmitter unit at an auxiliary interface at the driving contrivance, indeed met is the requirement for a direct attachment of the driving contrivance to the fixture, however the total structural volume is not reduced by this since these types of transmitter units consisted of a box-shaped housing with end switches disposed therein. Because of the need to provide an auxiliary interface for the transmitter unit at the driving contrivance, expense was increased still more. Besides this, the position of the control shaft with this type of transmitter unit could only be indicated indirectly, which, particularly in the case of an error in the driving contrivance, led to an erroneous indication.

Finally, there existed another disadvantage of the previously-described transmitter units, in that they had to be installed as auxiliary components on the fixture and/or the driving contrivance, whereby the expense for mounting increased.

SUMMARY OF THE INVENTION

Therefore, the object of the invention is to further develop a fixture of the initially-mentioned type such that positive detection of the position of the control shaft, with direct mounting of the driving contrivance on the attachment flange of the fixture, is possible, with the total structural volume not being increased or, compared to the state of the art, not being essentially increased.

This objective is resolved in accordance with the invention in that at least one sensor for detecting the position of the control shaft, and therewith the operating position of the movable member, is provided in a recess arranged in the front face of the attachment flange, and open toward the control shaft.

Accordingly, the sensor is no longer arranged like the usual transmitter units external to the fixture, between this latter and the driving contrivance, but rather in the attachment flange of the fixture, and actually within the recess provided on the front face of the attachment flange. Since the sensor therewith "disappears" inside the attachment flange, a direct mounting of the driving contrivance to the front face of the attachment flange is possible, without, thereby, the structural volume of the total arrangement made up of fixture and driving contrivance being enlarged. If the driving-contrivance is placed with its counterflange on the front face of the attachment flange of the fixture, the recess forms, in the front face of the attachment flange, a closed hollow space, inside of which is arranged the sensor. In this way, arrangement of a cover for covering the recess for protection of the sensor is not necessary. In order that the sensor be capable of measuring the position of the control shaft, the recess is open toward the control shaft. Achieved in this manner is that the sensor can directly sense the actual position of the control shaft. Since, by means of the arrangement in accordance with the invention, the sensor is integrated inside the attachment flange, therewith in the fixture, together with the fixture it forms a complete structural unit, wherewith the mounting is simplified. Additionally, the installer no longer needs to calibrate the sensor at the site, since this can be done at the time of manufacturing the fixture. Also, calibration errors are excluded to the greatest extent with the arrangement in accordance with the invention. Still to be mentioned as a further advantage of the invention is that the sensor is easily accessible and replaceable.

At this point, let yet be noted that the control shaft can also be constructed as a lifting and/or a positioning spindle.

In a preferred form of embodiment of the invention, the sensor consists of a mechanical indicator that is joined in rotation-fast fashion with the control shaft and disposed in freely-movable fashion inside the recess corresponding to the position of the control shaft, with the free end of the mechanical indicator extending through a feedthrough joining the recess with the outside of the attachment flange, external to its front face. Realized with this embodiment in particularly simple manner is a direct sensing and indication of the actual position of the control shaft. Here, the position of the free end of the mechanical indicator inside the feedthrough indicates directly the position of the control shaft.

A further development of this embodiment is characterized in that the mechanical indicator displays a first arm that is attached essentially radially to the control shaft and disposed inside the recess, and a second arm set at an angle to the first arm, which is directed away from the front face and extends through a longitudinal slot forming the feedthrough that runs along a circular path about the longitudinal axis of the control shaft. This further development is essentially suitable for sensing the rotational position of the control shaft. It further allows only a slight depth for the recess in the front face of the attachment flange if, in particular, the control shaft is arranged in non-displaceable fashion in the axial direction, the front face of the attachment flange forms an essentially flat surface and the control shaft runs at a right angle to the front face.

If the fixture is constructed as a control valve and the movable member is constructed for closing the control valve, the slot can advantageously run in a quarter-circle arc. The movement of the free end of the mechanical pointer along a quarter-circle path through the quarter-circle, arc-shaped slot corresponds to a quarter circle rotation of the movable member for opening and/or closing the control valve.

At this point, let further be noted that the free end of the mechanical pointer can be scanned on the outside of the attachment flange by additional feeler elements such as, for example, end switches, and the feeler element can transfer the detected position of the mechanical pointer, in the form of signals, to other parts of the installation.

Also possible is a form of embodiment with which the mechanical pointer is arranged only inside the recess and actuates one or more microswitches likewise located inside the recess.

Instead of a mechanical sensing and display of the control shaft, the sensor can alternatively include a coding element installed on the control shaft and a feeler element cooperating in non-contacting fashion therewith. This type of construction of the sensor in many cases has the advantage of an uncomplicated arrangement and a longer life for the sensor. These types of sensors today have an extremely small structural form, which is of advantage for an arrangement inside the recess.

In a further development of this embodiment, capable of being provided as a coding element is a magnet mounted on the control shaft and, as a feeler element, a reed relay arranged adjacent to the control shaft and reacting to the magnets. The advantages of reed relays lie in their very short switching times and low switching capacitances, as well as in their long life spans. Additionally, they are insensitive to dust and moisture and, in this manner, are maintenance-free and can be operated in any position.

Here, the outside of the attachment flange can be provided with an electrical connector for the reed relays. In this manner, the switching signal can be transferred to the outside. In particular, the electrical connector can serve as an interface for a process computer, whereby personnel costs are lowered and the safety of the installation is increased.

It is particularly advantageous if an optical indicator element is provided on the outside of the attachment flange, which is connected between the reed relay and the electrical connector. In this manner, obtained at any time is optical information concerning the position of the control shaft and, therewith, concerning the operating condition of the fixture. The power supply for the optical indicator element is obtained here from the outside, via the electrical connector.

In place of an external power supply via the electrical connector, it is also possible to additionally arrange a battery in the recess, with the reed relays being connected between the battery and the visual indicator element. The battery is switched to or from the optical indicator element by the reed relay in correspondence with the position of the control shaft and, therewith, the magnets attached thereto, relative to the reed relays. This arrangement has the advantage of not requiring an external power supply, since the complete current circuit, including the power supply, is provided inside the recess of the attachment flange.

Advantageously, several reed relays can be disposed about the control shaft. This further development has the advantage that different angular positions of the control shaft can be sensed. In this manner, sensing of the duration of rotation of the control shaft and, therewith, the duration of movement of the member from one working position into another working position is possible. This is because the rotation time of the control shaft can also be drawn upon as an index of whether there is or is not a faulty function. With a given torque of the driving contrivance, rotation of the control shaft slows if, for example, too great friction appears in the control shaft bearing. Based on the drop in the rotation time of the control shaft, it is therewith possible to note this bearing damage.

Another alternative to a non-contacting design of this sensor consists in that provided as a coding element is a coding disk installed concentrically on the control shaft, and as a sensing element a light barrier. With this arrangement, it is also possible to sense different angular positions of the control shaft. Possible, as a rule, with the coding disk is an essentially more exact sensing of the angular position of the control shaft, since essentially smaller angle steps can be measured. Hence, this embodiment is particularly suited for implementation in a regulating circuit for regulation of the position of the movable member.

Because of its small structural form, a forked light barrier should be provided.

If, in the case of certain applications, the space inside the recess in the attachment flange should not suffice when, for example, several sensors and associated components must be provided, then in another preferred construction of the invention, capable of being provided is an intervening plate that can be installed on the front face of the attachment flange, which contains a knockout for accommodating one or several sensors and associated components. The particular advantage of arranging an intervening plate likewise consists in the fact that fixtures already built into installations can be equipped at a later time, in simple manner, with the previously described sensors. The arrangement of the intervening plate enables a modular construction whereby, compared to the fixture, the slightly raised arrangement of a driving contrivance on the intervening plate increases the structural volume of the entire unit only insignificantly. Advantageously, the knockout in the intervening plate aligns essentially with the recess in the front face of the attachment flange.

Preferably, at least one additional sensor can be arranged within the recess for monitoring the temperature of the medium and/or for detecting leakage in the region of the feedthrough of the control shaft through the attachment flange. With these types of additional sensors, a complete monitoring of the fixture is possible.

Finally, let further be mentioned that in the case of the fixture in accordance with the invention it is possible to be dealing with a control valve for controlling the flow of a medium, in which the movable member is constructed for closing the fixture, and the control shaft, sealed relative to the fixture, is led to the outside through the flange.

Explained in more detail in the following with the aid of the accompanying drawings, will be advantageous forms of embodiment of the invention.

BRIEF DESCRIPTION OF THE DRAWINGS

FIG. 6 shows the preferred rotational positioning sensor of the present invention in combination with a driving contrivance and control valve.

DETAILED DESCRIPTION OF THE PREFERRED EMBODIMENT

Figure 1A:
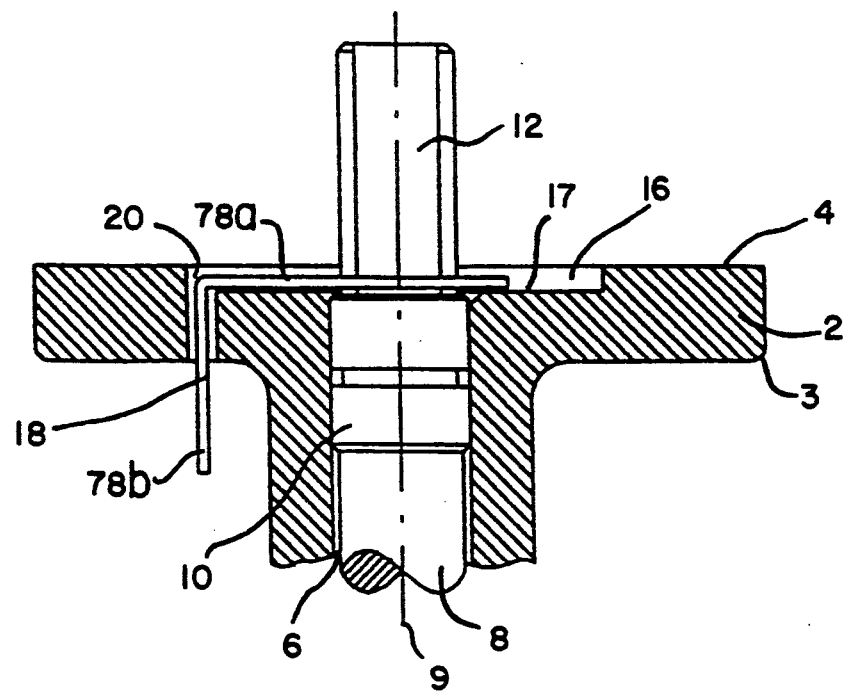
FIG. 1 shows one embodiment of the invention with a mechanical indicator, in a longitudinal cut (a) and in a top view (b)

Represented in FIGS. 1*a* and b is an attachment flange 2 with an outer side 3 and a front face 4. The attachment flange 2 is part of a control valve (V, FIG. 6). Running at a right angle to the front face 4, through the attachment flange 2, is a boring 6 that ends at the front face 4. Extending through the boring 6 toward the outside is a control shaft 8. The control shaft is joined in rotation-fast fashion with a closure member of the control valve (exemplified by element F of FIG. 6), which can, for example, be embodied as a shutter-disk, ball, stopcock or cone. Here, the longitudinal axis 9 of the control shaft 8 simultaneously forms the hinge axis of the closure member. The control shaft 8 has a sealed section 10, so that the control shaft 8 finds itself in sealing connection with the inner wall of the boring 6, is sealed off, in the region of the boring 6 of the inner space of the control valve, against the surroundings, and medium is conducted through the control valve and can not penetrate to the outside.

Figure 1B:
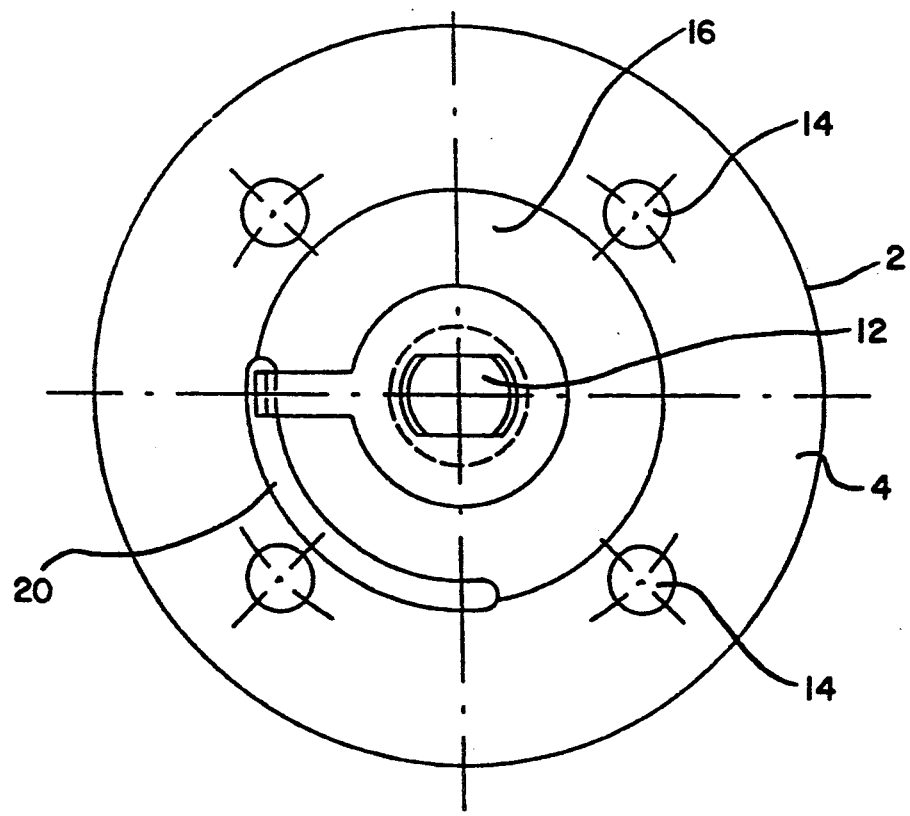

The free end 12 of the control shaft 8 is provided as a connecting piece for a rocking lever or an output shaft of a non-represented pivot drive. The pivot drive can be mounted with its counterflange against the front face 4 of the attachment flange 2, whereby, with installed pivot drive, its output shaft is coupled with the free end 12 of the control shaft 8. For attaching the non-represented pivot drive, provided in the attachment flange 4 are attachment holes, as can be recognized from FIG. 1*b*. The control shaft 8 is rotated with the aid of the pivot drive, whereby the movable member opens or closes the control valve. Provided on the front face 4 of the attachment flange 2 is a recess 16 that forms a depression relative to the front face 4. The recess 16 is constructed in a circular form and arranged concentrically to the longitudinal axis 9 of the control shaft 8 (FIG. 1*b*). In this manner, the control shaft 8 runs through the recess 9. As can be seen from FIG. 1*a*, the recess has a particular depth, with the floor 17 of the recess 16 forming a flat surface that runs parallel to the front face 4, which likewise forms a flat surface.

Provided for indication of the rotational position of the control shaft 8 is a mechanical position indicator 18. The mechanical position indicator 18 has a flat, first arm 18*a* running linearly and parallel to the front face 4, respectively to the floor 17, said arm being attached in rotation-fast fashion to the control shaft 8, and arranged inside the recess 16, between its floor 17 and the plane encompassed by the front face 4. Joined at a right angle to the first arm 18*a* is a rectilinearly-running second arm 18*b* that is pointing away from the front face 4 and guided through a longitudinal slot 20 that runs along a quarter-circle path about the longitudinal axis 9 of the control shaft 8. The mechanical position indicator 18 can be made of a flat sheet and/or of flat iron, so that the depth of the recess 16 as well as the thickness of the longitudinal slot 20 can be kept relatively small as a function of the position indicator 18.

The mechanical position indicator 18 enables, in a mechanical way, a direct indication of the rotational position of the control shaft 8 and, therewith, the operating position of the closure member. Here, the mechanical position indicator 18 shows the closed and/or open position of the closure member when the second arm 18b of the position indicator 18 is located next to the one or the other end of the longitudinal slot 20.

Represented in the following FIG. 2 to 5 are other embodiments of the invention, where the same reference numbers are used for the same parts, that will not be gone into in any further detail since they were already described previously.

The other examples of embodiment of the invention represented in FIGS. 2 to 5 are differentiated from the example of embodiment represented in FIG. 1 by the fact that sensing of the rotational position of the control shaft 8 is accomplished in non-contacting fashion.

Figure 2A:
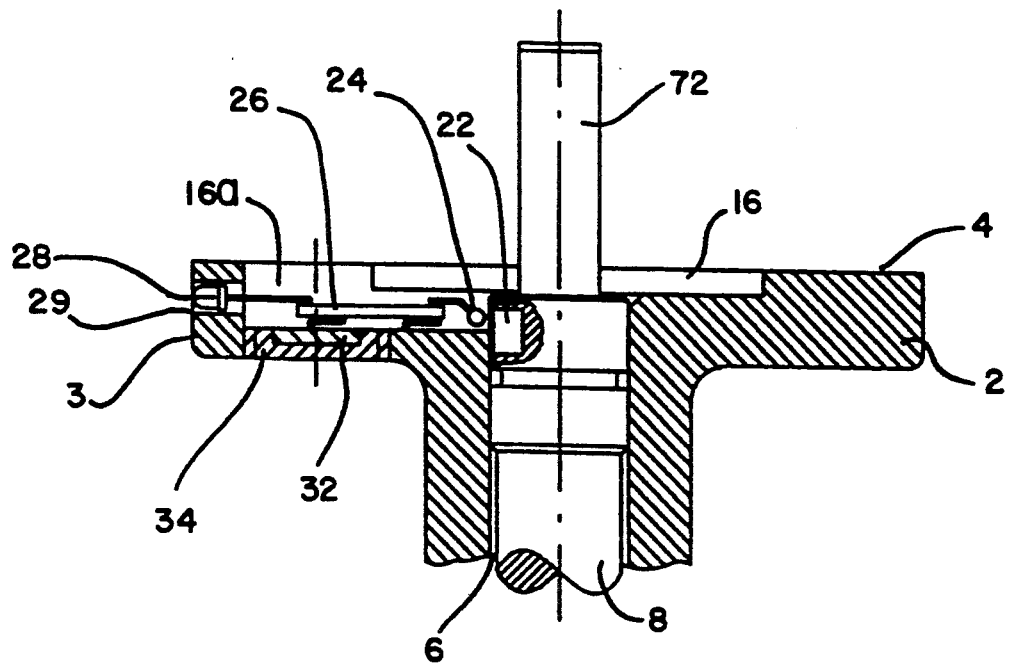
FIG. 2 shows a second form of embodiment with a reed relay, in a longitudinal cut (a) and in a top view (b)
Figure 2B:
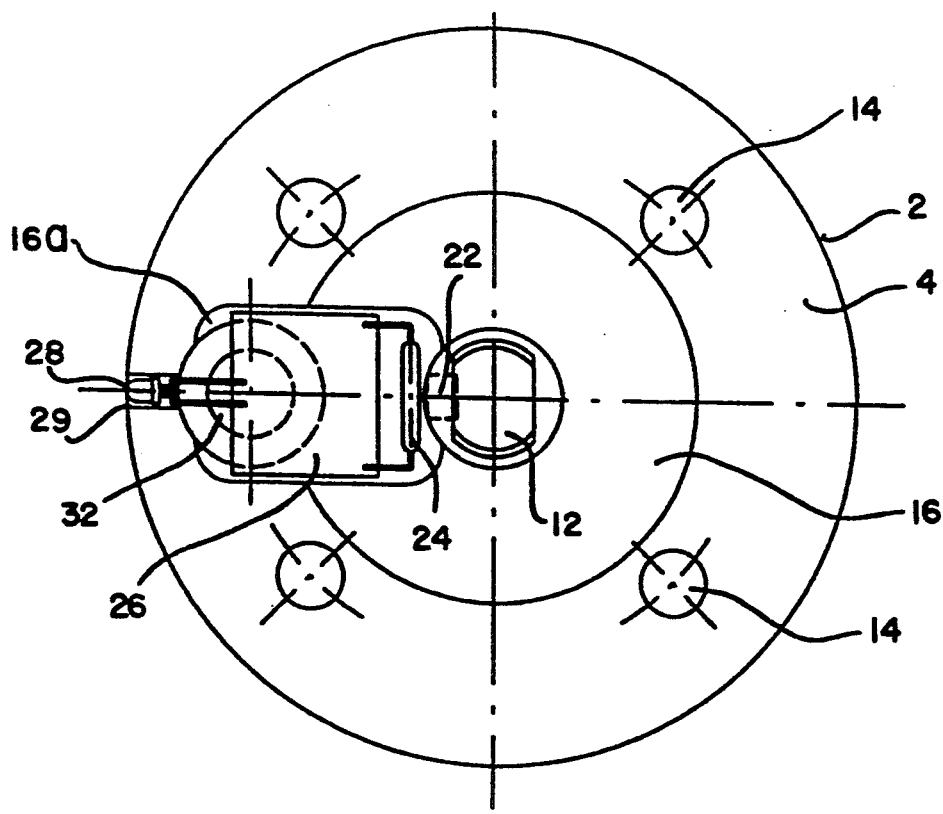

In the case of the embodiment represented in FIG. 2, provided additionally to the recess 16 is another recess 16a that displays a greater depth than the recess 16 and extends from the control shaft out over the edge of the recess 16. Installed on the control shaft 8, at the level of the additional recess 16a, is a magnet 22 that acts on the reed relay 24 that is located inside the additional recess 16a. Reed relays, because of their small structural form, whose space dimensions are limited. Further arranged inside the recess 16a is a plate bar 26 on which are mounted the contacts of the reed relay 24. Also soldered to the plate bar 26 is a light-emitting diode 28 that is plugged in through a boring 29 leading to the outer side 3 of the attachment flange 2. Further connected to the plate bar 26 is a battery 32 that is disposed inside a battery receptacle 34 that is open toward the recess 16a. The reed relay 24, the light-emitting diode 28 and the battery 32 are connected in series to form a closed current circuit. The non-represented contact fingers of the reed relay 24 close as the magnet 22 approaches, so that the voltage generated by the battery 32 is applied to the light-emitting diode 28, and the light-emitting diode 28 lights up. Obtained in this manner is an optical (visual) indication of the rotational position of the control shaft 8.

Figure 3A:
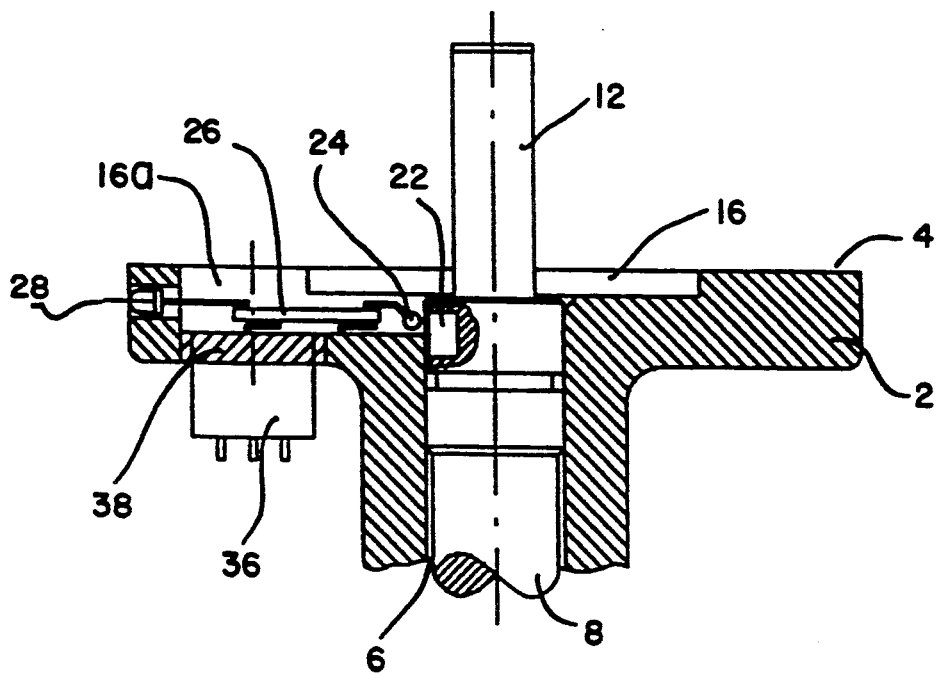
FIG. 3 shows a third form of embodiment with a reed relay, in a longitudinal cut (a) and in a top view (b)
Figure 3B:
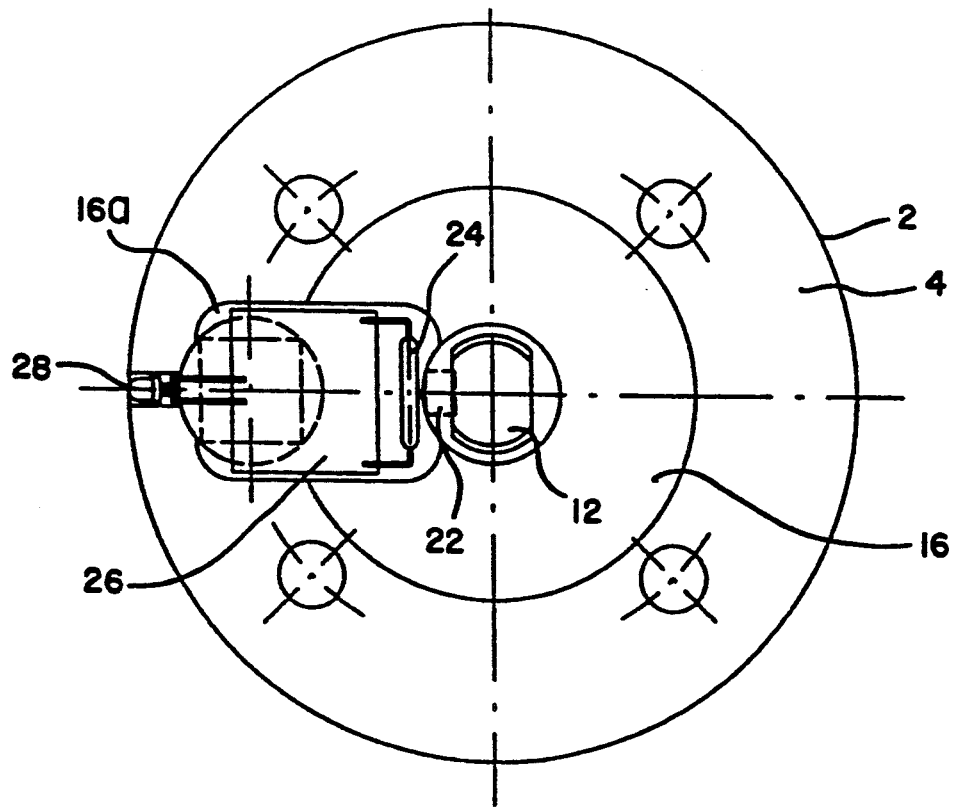

Capable of being provided in place of the battery 32 and the battery receptacle 34 is a plug 36 on the outer side 3 of the attachment flange 2, situated on a plug receptacle 38, to which the connection contacts to the plate bar 26 are led, as can be recognized in FIG. 3. In the case of this embodiment, the power is obtained from the outside, via the plug 36, by connecting to the plug 36 an external source of voltage for the purpose of lighting the light-emitting diode 28. Additionally, the plug 36 has the further task of leading to the outside the switching signals generated by the reed relay 24. For example, it is possible to connect to the plug 36 an interface that transfers to a process computer the switching signals representing the rotational position of the control shaft 8, so that at any given time the status of the control valve can be automatically monitored while in operation. Moreover, it is also possible to connect to the plug 36 an acoustical transducer. It is likewise conceivable to omit the light-emitting diode 28.

In order to be able to sense not only a particular rotational position but rather several different rotational positions of the control shaft 8, it is possible to dispose around the control shaft 8 several reed relays 24.

Figure 4A:
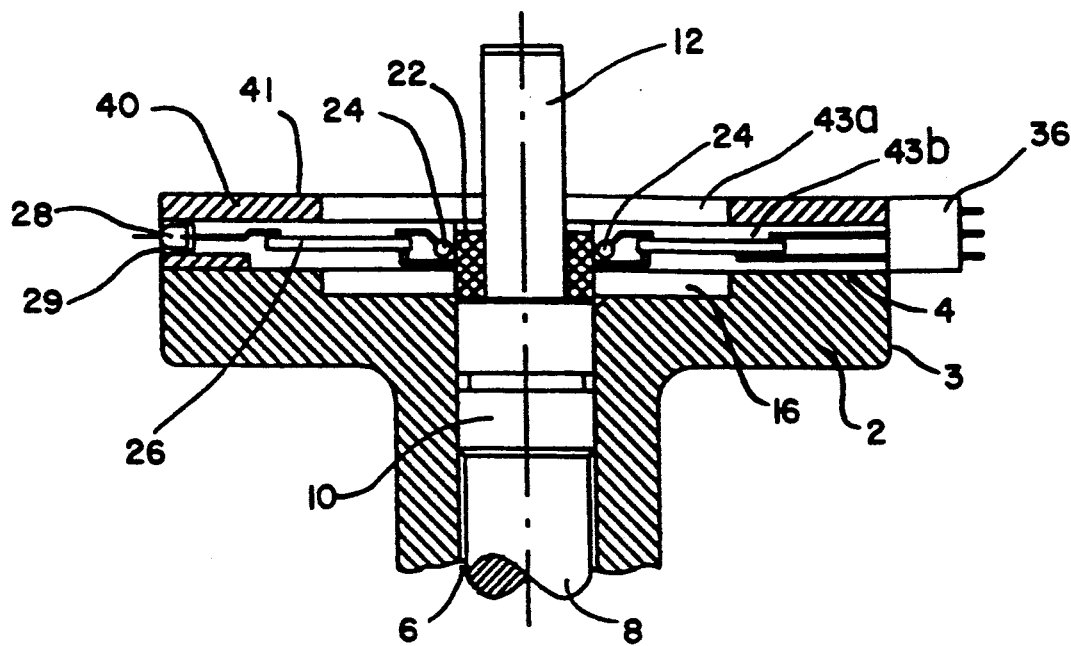
FIG. 4 shows a fourth form of embodiment with two reed relays, in a longitudinal cut (a) and in a top (b)
Figure 4B:
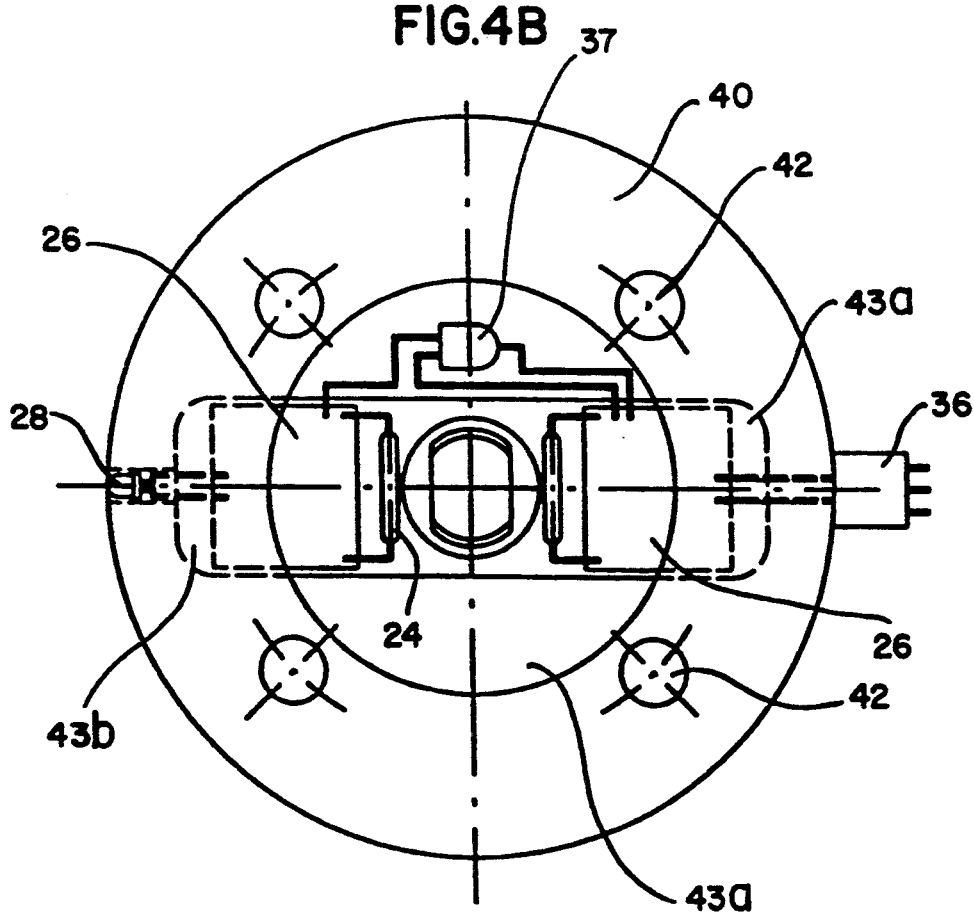

Represented in FIG. 4 is an embodiment where two reed relays 24 are arranged in oppositely-lying positions. At this point, let be mentioned that the right-hand reed relay 24 in FIG. 4 is connected directly to the plug 36 while omitting the light-emitting diode. Both plate bars 26 are coupled with one another via an AND-element 37. In this manner, formed is a so-called 2-track circuit, which assures that the correct position signal will be given to the process computer or the watchman, via the plug 36, even if the light-emitting diode 28 has failed and, therewith, delivers to the watchman at the site a false indication. Therefore, the function of the light-emitting diode 28 is monitored by a second relay, according to FIG. 4 the right-hand relay 24.

In the case of the embodiment represented in FIG. 4, the reed relays 24, the plate bar 26 and the light-emitting diode 28 are not arranged in the recess 16 but rather in an intervening plate 40. The intervening plate 40 lies flatly on the front face 4 of the attachment flange 2, so that now the non-represented pivot drive can be mounted on the oppositely-lying front face 41 of the intervening plate 40. The front face 41 of the intervening plate 40 forms a plane surface and runs parallel to the front face 4 of the attachment flange 2. Moreover, provided in the intervening plate 40 are attachment holes 42 that align with the attachment holes 14 (compare FIG. 1b to 3b and 5b) in the attachment flange 2.

The intervening plate 40 displays a knockout 43a that aligns with the recess 16 in the front face 4 of the attachment flange 2, as can be recognized particularly well in FIG. 4a. Additionally, provided in the intervening plate 40, in the front face lying opposite to the front face of the attachment flange 2, in its underside, are recesses 43b that are in communication with the knockout 43a and that extend radially toward the outside. The knockout 43a and the recesses 43b serve for accommodating the reed relays 24, the plate bar 26, the light-emitting diode 28, as well as the conductors to the plug 36, which, in the embodiment represented, is mounted at the peripheral rim of the intervening plate 40. Since these components are relatively compact, the thickness of the intervening plate 40 can be maintained small, so that no intermediate shaft piece needs to be coupled between the free end 12 of the control shaft 8 and the pivot drive that is to be installed on the front face 41 of the intervening plate 40. In this manner, the slight increase in height resulting from this is kept within tolerable limits. The use of the intervening plate 40 is, of course, practical when the space present within the recess 16 no longer suffices, without, however, having to abandon the advantages of the arrangement in accordance with the invention. With the aid of the knockout 43a and the recesses 43b in the intervening plate 40, obtained is space for accommodating additional components for sensing the position of the control shaft 8 and other operating statuses of the control valve. The use of the foregoingly-described intervening plate 40 is particularly suited for fixtures already built into existing installations.

Figure 5A:
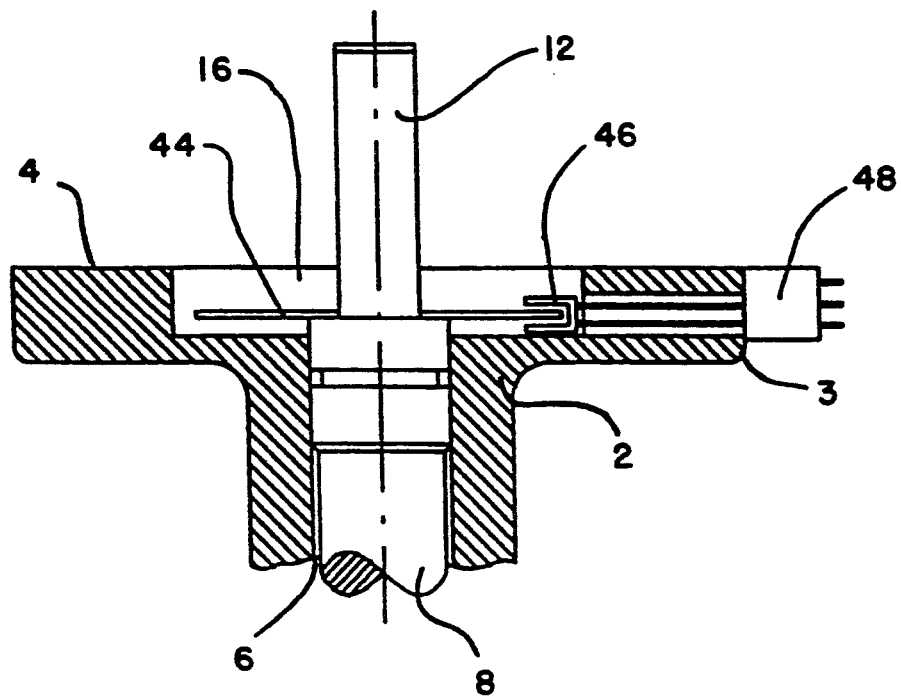
FIG. 5 shows a fifth form of embodiment with a coding disk and a light barrier, in a longitudinal cut (a) and in a top view (b).
Figure 5B:
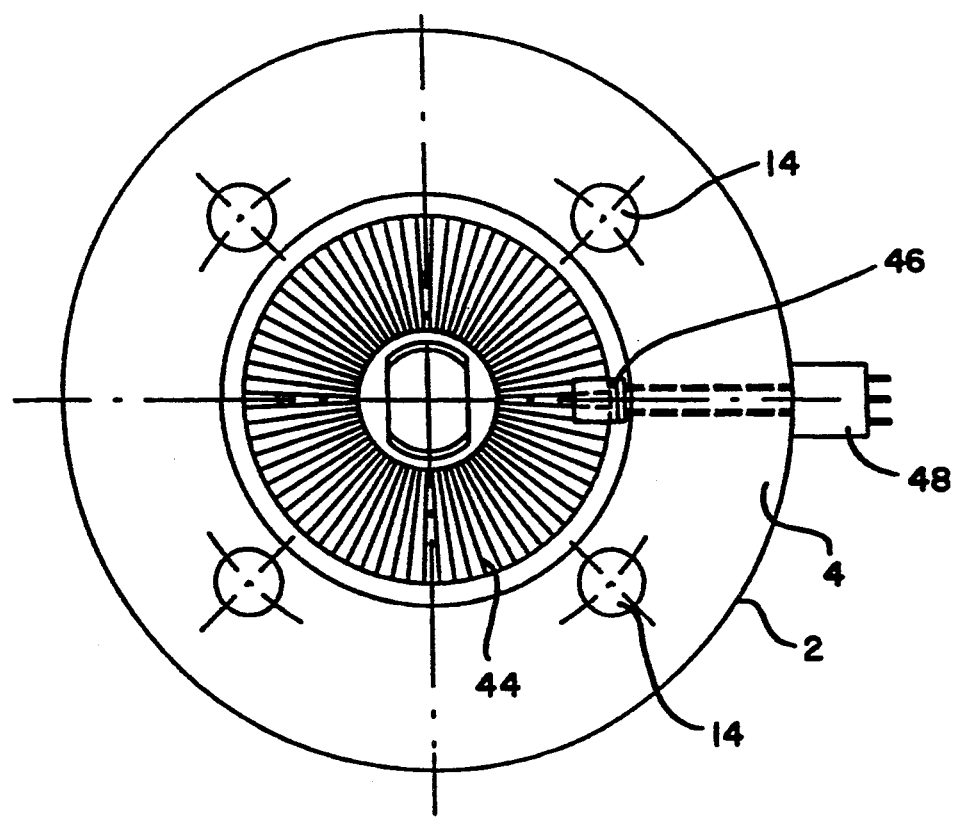

Another and more exact possibility for being able to sense different rotational angle positions of the control shaft 8 is offered by the arrangement of a coding disk 44, as is shown in FIG. 5. Here, the coding disk 44 is mounted concentrically on the control shaft 8, inside the recess 16. Further, disposed inside the recess 16 is a forked light barrier 46 through which the peripheral rim of the coding disk 44 runs and that is connected to a plug 48 mounted on the outer side 3 of the attachment flange 2. The forked light barrier 46 has a particularly compact structural form and is therefore particularly suited for an arrangement inside the recess 16. The coding disk 44 has markings in small increments of angle, e.g. in steps of 2.5°, which permits a very exact sensing of the rotational angle position of the control shaft 8. With this, it is also possible to determine from the change in rotational angle position 8 (sic) over a period of time the rotational speed of the control shaft 8. A determination of the duration of rotation of the control shaft 8 is important for monitoring the function of the control valve, since a too short duration of rotation permits making a conclusion as to errors, such as for example an increased resistance to rotation, a faulty mounting or a hardening of the sealing rings situated between the control shaft 8 and the boring 6.

Further, let it be pointed out that it is possible to arrange within the recess 16 and/or 16a of the attachment flange, and possibly within the intervening plate 40, additionally still at least one other sensor for monitoring miscellaneous operating parameters, such as temperature of the medium and/or the sealing of the control shaft 8. In particular, checking the sealing of the control shaft 8 by means of a sensor reacting to moisture and an indication of leakage thereafter, is particularly advantageous since in this manner a leak in the control valve can be recognized early.

FIG. 6 illustrates the preferred attachment flange 2 connected to a driving contrivance D and a valve V. A moveable flap F is attached to the control shaft 8 within the valve V. The flap F is pivotable around the axis of the shaft 8 between a closed position as shown in FIG. 6 and an open position, which corresponds to a 90-degree rotation of the flap F. It will be understood by those skilled in the art that the control valve illustrated in FIG. 6 represents only one possible embodiment of the present invention. The rotational positioning sensor of the present invention can be used with a variety of valve types, including ball valves. Further, it will be understood that any of the embodiments discussed above can be used in combination with the control valve configuration illustrated in FIG. 6.

I claim:

1. A fixture containing a rotational position sensor for detecting movement of a member comprising:
   an attachment flange having a through-opening, an outer surface and a front face for mounting of a driving contrivance, said front face having a recess proximate to said through-opening;
   a control shaft with a control end and a free end, said control end attached to the member, said free end passing through said through-opening of said attachment flange for connection to the driving contrivance; and
   at least one sensor for detecting the position of said control shaft disposed within said recess, whereby said attachment flange essentially conceals said sensor when the driving contrivance is mounted to said attachment flange.

2. The apparatus of claim 1 wherein said sensor comprises:
   a coding element installed on said control shaft; and
   a scanning element cooperating in a non-contacting fashion with said coding element.

3. The apparatus of claim 2 wherein said coding element is a magnet mounted to said control shaft and said scanning element is a reed relay disposed in said recess proximate to said magnet.

4. The apparatus of claim 3 wherein an opening is provided in said attachment flange, said opening connecting said recess to said outer surface.

5. The apparatus of claim 4 wherein an electrical connector in communication with said reed relay is provided in said opening on said attachment flange.

6. The apparatus of claim 4 wherein an optical indicating element in communication with said reed relay is provided in said opening on said attachment flange.

7. The apparatus of claim 4 wherein an optical indicating element in communication with said reed relay is provided in said opening on said attachment flange and a battery disposed in said recess, said reed relay being electrically connected to said battery.

8. The apparatus of claim 3 wherein at least two reed relays are disposed proximate to said control shaft.

9. The apparatus of claim 2 wherein said coding element is a transparent disk with a plurality of opaque markings mounted concentrically on said control shaft and said scanning element is an optical encoder for detecting said markings.

10. The apparatus of claim 1 further including an intervening plate with a central bore mounted on said front face of said attachment flange.

11. The apparatus of claim 10 wherein said bore in said intervening plate is in substantial alignment with said recess.

12. The apparatus of claim 1 wherein the fixture is provided at a control valve for controlling the flow of a medium, the member is provided for closing the control valve, and a seal is provided between said control shaft and said through-opening whereby foreign matter is excluded from said recess.

13. The apparatus of claim 1 further including a temperature sensor disposed in said recess.

14. The apparatus of claim 1 further including a moisture sensor disposed in said recess.

15. The apparatus of claim 1 wherein said attachment flange contains a feedthrough connecting said recess with said outer surface and said sensor comprises a mechanical indicator, said mechanical indicator being joined in rotation-fast fashion with said control shaft and arranged in freely movable fashion in said recess corresponding to the position of the control shaft, said attachment flange further including a second arm attached to said mechanical indicator and extending through said feedthrough.

16. The apparatus of claim 15 wherein said feedthrough comprising a longitudinal slot that runs along a circular path substantially about the control shaft and said mechanical indicator has a first arm which is attached essentially radially on said control shaft in said recess, and said second arm is set at an angle to said first arm that is directed away from said front face and extends through said longitudinal slot.

17. The apparatus of claim 16 wherein said longitudinal slot runs along a quarter-circle arc.

* * * * *

UNITED STATES PATENT AND TRADEMARK OFFICE
CERTIFICATE OF CORRECTION

PATENT NO. : 5,150,103

DATED : September 22, 1992

INVENTOR(S) : Peter Janssen-Weets

It is certified that error appears in the above-identified patent and that said Letters Patent is hereby corrected as shown below:

In column 7, line 17, after "shaft" insert --8--.

In column 7, line 21, after "form," insert --are particularly advantageous for arranging inside the recess 16a--.

Signed and Sealed this

Second Day of November, 1993

Attest:

BRUCE LEHMAN

Attesting Officer

Commissioner of Patents and Trademarks